J. KRUMMENAUER.
Animal-Traps.
No. 136,378. Patented March 4, 1873.
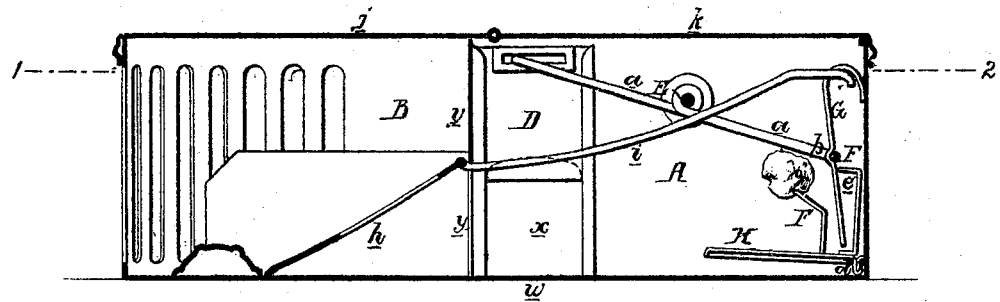
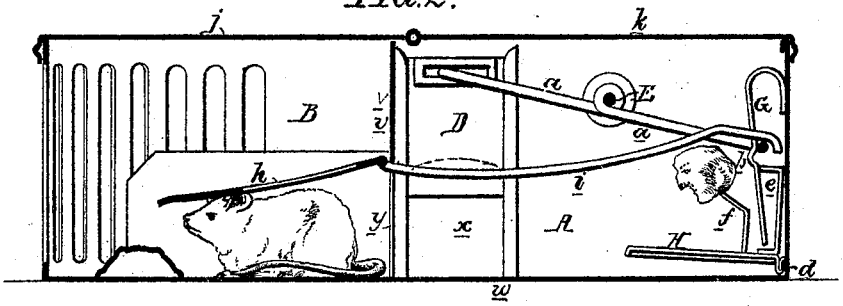
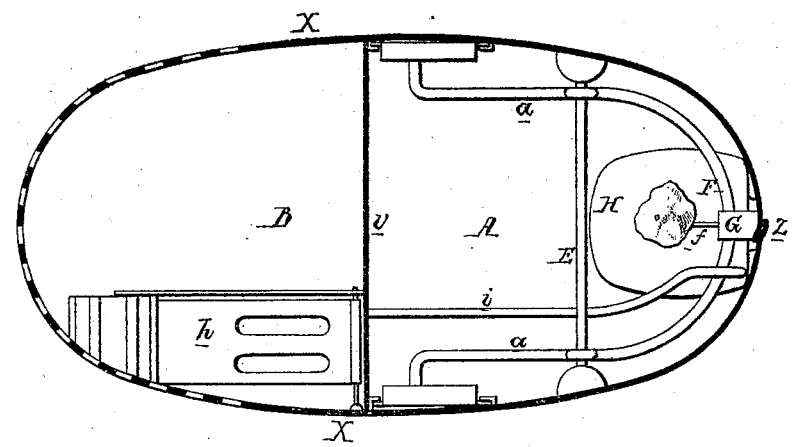

UNITED STATES PATENT OFFICE.

JOHN KRUMMENAUER, OF NEW YORK, N. Y.

IMPROVEMENT IN ANIMAL-TRAPS.

Specification forming part of Letters Patent No. 136,378, dated March 4, 1873.

*To all whom it may concern:*

Be it known that I, JOHN KRUMMENAUER, of the city, county, and State of New York, have invented an Improved Self-Setting Animal-Trap, of which the following is a specification:

The object of my invention is to catch a number of animals successively in a single trap; and this object I accomplish by constructing the trap, in the manner fully described hereafter, so that each animal, when caught, shall, in passing from a dark into a light compartment in its efforts to escape, reset the trap.

My invention will be fully understood from the following detailed description, reference being had to the accompanying drawing, in which—

Figures 1 and 2 are sectional elevations with the working parts in different positions; and Fig. 3, a sectional plan view on the line 1 2, Fig. 1.

The trap consists of two compartments, A and B, the former of which, when its sliding doors D D are closed, is dark, while the compartment D has grated sides and top, so as to freely admit the light. The doors D D are arranged to be simultaneously raised by the arms $a\,a$ of a rock-shaft, E, which extends across the trap, the said arms being, in the present instance, formed of bent wire, in one piece with a yoke, F, which, when lowered for the purpose of opening the doors, is caught and retained by the notched or bent portion $b$ of a spring-plate, G, secured at the top, but free to vibrate at its lower end. A platform, H, hung at $d$, is maintained in an elevated position by the spring-plate G, against which its arm $e$ bears; and to the top of the said platform is secured the bait-hook $f$.

The mouse or other animal enters the compartment A through one of the openings $x$ beneath the raised doors D, when the trap is set, as shown in Fig. 1; and in endeavoring to reach the bait depresses the platform H, the arm $e$ of which forces the spring-plate G outward, and thus disengages the yoke F, when the sliding doors will suddenly descend by their own weight and close the openings $x$. The animal, in endeavoring to escape, will pass through the opening $y$ from the dark compartments A into the light compartment B, and in so doing will elevate the inclined trap-door $h$, as shown in Fig. 2, thus causing a long bent arm, $i$, of the said door to bear upon and depress the yoke F sufficiently to cause its re-engagement with the notched retaining-spring G and the reopening of the doors D. In other words, the trap will be reset by the lifting of the inclined door $h$, which will fall by its own weight to its original position, Fig. 1, when the animal has entered the compartment B, from which it cannot escape. The animals can be removed from the compartment B on lifting a hinged lid, $j$, and access can be had to the compartment A for purposes of cleansing, &c., on lifting a hinged lid, $k$.

It will be observed, on reference to Fig. 3, that the frame of the trap is of an oval shape, and free from sharp corners, the whole of the walls of the trap being formed from a single strip, X, of sheet metal, bent to the required shape and joined together at its opposite ends at the point $z$. The bottom plate $w$ and partition $v$ impart the required rigidity to this curved frame, which is of more economical construction than a frame formed of several straight pieces soldered together at the corners.

I claim as my invention—

1. The combination, substantially as described, of the spring-retainer G with the vibrating yoke F and door or doors D.

2. The combination of the vibrating platform H carrying the bait, its arm $e$, and the spring-retainer G, constructed and arranged to operate substantially as described.

3. The combination, substantially as described, of the trap-doors, the yoke F, and the arm $i$ of the door, arranged to bear against the said yoke.

4. The trap-frame, consisting of a flat bottom plate, $w$, strengthening-partition $v$, and curved walls X, formed of a single strip of sheet metal.

In testimony whereof I have signed my name to this specification in the presence of two subscribing witnesses.

JOHN KRUMMENAUER.

Witnesses:
   FREDERICK DIETZ,
   W. H. DE HART.